United States Patent
Chou et al.

(10) Patent No.: US 10,805,407 B2
(45) Date of Patent: *Oct. 13, 2020

(54) SUPPORTING HIGH AVAILABILITY FOR ORCHESTRATED SERVICES

(71) Applicant: International Business Machines Corporation, Armonk, NY (US)

(72) Inventors: Wei-Ting Chou, Taipei (TW); Chih-Hsiung Liu, Taipei (TW); Hao-Ting Shih, Taipei (TW); Joey H. Y. Tseng, Taipei (TW)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/185,027

(22) Filed: Nov. 9, 2018

(65) Prior Publication Data

US 2019/0098097 A1    Mar. 28, 2019

Related U.S. Application Data

(63) Continuation of application No. 14/956,636, filed on Dec. 2, 2015, now Pat. No. 10,158,726.

(51) Int. Cl.
*G06F 15/173* (2006.01)
*H04L 29/08* (2006.01)
(Continued)

(52) U.S. Cl.
CPC .......... *H04L 67/16* (2013.01); *H04L 41/5012* (2013.01); *H04L 41/5019* (2013.01);
(Continued)

(58) Field of Classification Search
CPC . H04L 41/5012; H04L 41/5019; H04L 67/10; H04L 67/12; H04L 67/148; H04L 67/16; H04L 67/22; H04Q 3/0054
See application file for complete search history.

(56) References Cited

U.S. PATENT DOCUMENTS 6,801,940 B1   10/2004   Moran et al.
8,997,078 B2    3/2015   Spivak et al.
(Continued)

FOREIGN PATENT DOCUMENTS

WO    2013016584 A1    1/2013
WO    2013122815 A1    8/2013
WO    2014165538 A2   10/2014

OTHER PUBLICATIONS

Behl et al., "Providing Fault-tolerant Execution of Web-service-based Workflows within Clouds", CloudCP 2012: 2nd International Workshop on Cloud Computing Platforms, Apr. 10, 2012, pp. 1-6, ACM.

(Continued)

*Primary Examiner* — Ryan J Jakovac
(74) *Attorney, Agent, or Firm* — Walter L. Rudberg; Brian M. Restauro

(57) ABSTRACT

Embodiments of the present invention provide a method and system for orchestrating services in a service chain. Establishing a first group with a plurality of active services and a second group with a plurality of standby services. Upon receiving an error notification of a crash in a service, moving the plurality of active services from the first group to the second group, and moving the plurality of standby services from the second group to the first group. Upon receiving an updated service group of the plurality of active services of the first group, moving the plurality of active services from the first group into the second group, and moving the plurality of standby services from the second group to a repository.

6 Claims, 6 Drawing Sheets

(51) Int. Cl.
*H04Q 3/00* (2006.01)
*H04L 12/24* (2006.01)

(52) U.S. Cl.
CPC .............. *H04L 67/10* (2013.01); *H04L 67/12* (2013.01); *H04L 67/148* (2013.01); *H04L 67/22* (2013.01); *H04Q 3/0054* (2013.01)

(56) References Cited

U.S. PATENT DOCUMENTS

| | | |
|---|---|---|
| 2003/0028642 A1 | 2/2003 | Agarwal et al. |
| 2010/0138688 A1 | 6/2010 | Sykes et al. |
| 2014/0298091 A1 | 10/2014 | Carlen et al. |
| 2014/0304352 A1 | 10/2014 | Chaudhary et al. |
| 2014/0304398 A1 | 10/2014 | Carlen et al. |
| 2015/0089274 A1 | 3/2015 | Mares et al. |
| 2015/0278046 A1* | 10/2015 | Zellermayer ....... G06F 11/1438 714/4.11 |
| 2017/0163742 A1 | 6/2017 | Chou et al. |

OTHER PUBLICATIONS

Moreno-Vozmediano et al., "IaaS Cloud Architecture: From Virtualized Datacenters to Federated Cloud Infrastructures", Computer, vol. 45, Issue 12, Published Mar. 6, 2012, Current Version: Dec. 20, 2012, pp. 65-72, IEEE.

Appendix P—List of IBM Patents or Patent Applications Treated as Related, Filed herewith, 2 Pages.

* cited by examiner

SUPPORTING HIGH AVAILABILITY FOR ORCHESTRATED SERVICES

BACKGROUND OF THE INVENTION

The present invention relates generally to the field of cloud computing and, in particular to high availability for orchestrating cloud services.

A cloud computing environment enables network access to a shared pool of configurable computer resources. The computing resources are typically in a virtualized environment where a user can access, on-demand, multiple virtual machines. Under this framework, users do not have to purchase, maintain, and operate infrastructure on site; rather purchase from a service provider the right to use such equipment.

Orchestrating cloud services involves the automating of various tasks involved in coordinating, organizing and managing software, services, and/or hardware. Orchestration may define various policies and service levels. For instance, orchestrating cloud services manages cross system computing functions, by arranging and coordinating tasks automatically. Orchestration manages the network infrastructure maintained by a service provider upon which developed web applications can be deployed. For example, a cloud based computing framework, can be designed to manage the logistics and orchestration of the environment by supporting development, running and the management of applications, allowing application developers to focus on software development rather than a systems infrastructure as well.

Cloud services may often deliver hundreds of services and API's which often cause services build on such platforms to become very complex. A common problem may arise as the more complex a system is, the high the potential risk of an error forming.

Additionally, cloud services are expected to serve users with minimal to no downtime. If an orchestrated cloud service crashes while processing a request, in order to maintain the service availability, providers often restart the service and notify the user (often the application developer) to manual troubleshooting, as each service within a chain is independent. Restarting a broken service may not resolve the issue if the crash may be caused by a recent change of the service (i.e., a service version update). Additionally, restarting a broken service may not resolve the issue if a change of other services that came before the service chain, as restarting the crashed service would only lead to endless crashes at that point, thereby making the orchestrated services unavailable.

SUMMARY

According to one embodiment of the present invention, a method is provided, comprising: for a first group and a second group, wherein the first group comprises a plurality of active services, and wherein the second group comprises a plurality of standby services, receiving, by one or more processors, an error notification, wherein the error notification identifies a crash in the plurality of active services of the first group; and responsive to receiving the error notification, moving the plurality of active services from the first group to the second group, and moving the plurality of standby services from the second group to the first group.

According to one embodiment of the present invention, a method is provided, comprising: for a first group, and a second group, wherein the first group, comprises a plurality of active services, and wherein the second group comprises a plurality of standby services, receiving, by one or more processors, a notification, wherein the notification comprises an updated service group of the plurality of active services of the first group; moving, by one or more processors, the plurality of active services from the first group into the second group, and moving the plurality of standby services from the second group to a repository; deactivating, by one or more processors, the plurality of active services of the second group, responsive to moving the plurality of active services from the first group to the second group; and updating the first group with the updated service group of the plurality of active services.

According to one embodiment of the present invention, a computer system is provided, comprising: a first group and a second group, wherein the first group is configured to process a plurality of active services, and wherein the second group is configured to process a plurality of standby services; a router, wherein the router is configured to receive a request from a user and forward the request to the first group; a service health monitor, wherein the service health monitor is configured to monitor and record a health status of the first group and of the second group; a repository, wherein the repository is configured to store changes of a plurality of services and record changes of the plurality of services; and a version control manager, wherein the version control manager is configured to recall the second group and move it to the first group, based in part on an indication from the service health monitor and a change order recorded in the repository.

According to one embodiment of the present invention, a computer system is provided, comprising: one or more computer processors; one or more computer readable storage media; program instructions stored on the one or more computer readable storage media for execution by at least one of the one or more processors, the program instructions comprising: for a first group and a second group, wherein the first group comprises a plurality of active services, and wherein the second group comprises a plurality of standby services, program instructions to receive an error notification, wherein the error notification identifies a crash in the plurality of active services of the first group; and responsive to receiving the error notification, program instructions to move the plurality of active services from the first group to the second group, and program instructions to move the plurality of standby services from the second group to the first group.

According to one embodiment of the present invention, a computer program product is provided, comprising: a computer readable storage medium and program instructions stored on the computer readable storage medium, the program instructions comprising: program instructions stored on the one or more computer readable storage media for execution by at least one of the one or more processors, the program instructions comprising: for a first group and a second group, wherein the first group comprises a plurality of active services, and wherein the second group comprises a plurality of standby services, program instructions to receive an error notification, wherein the error notification identifies a crash in the plurality of active services of the first group; and responsive to receiving the error notification, program instructions to move the plurality of active services from the first group to the second group, and program instructions to move the plurality of standby services from the second group to the first group.

DETAILED DESCRIPTION

Figure 1:
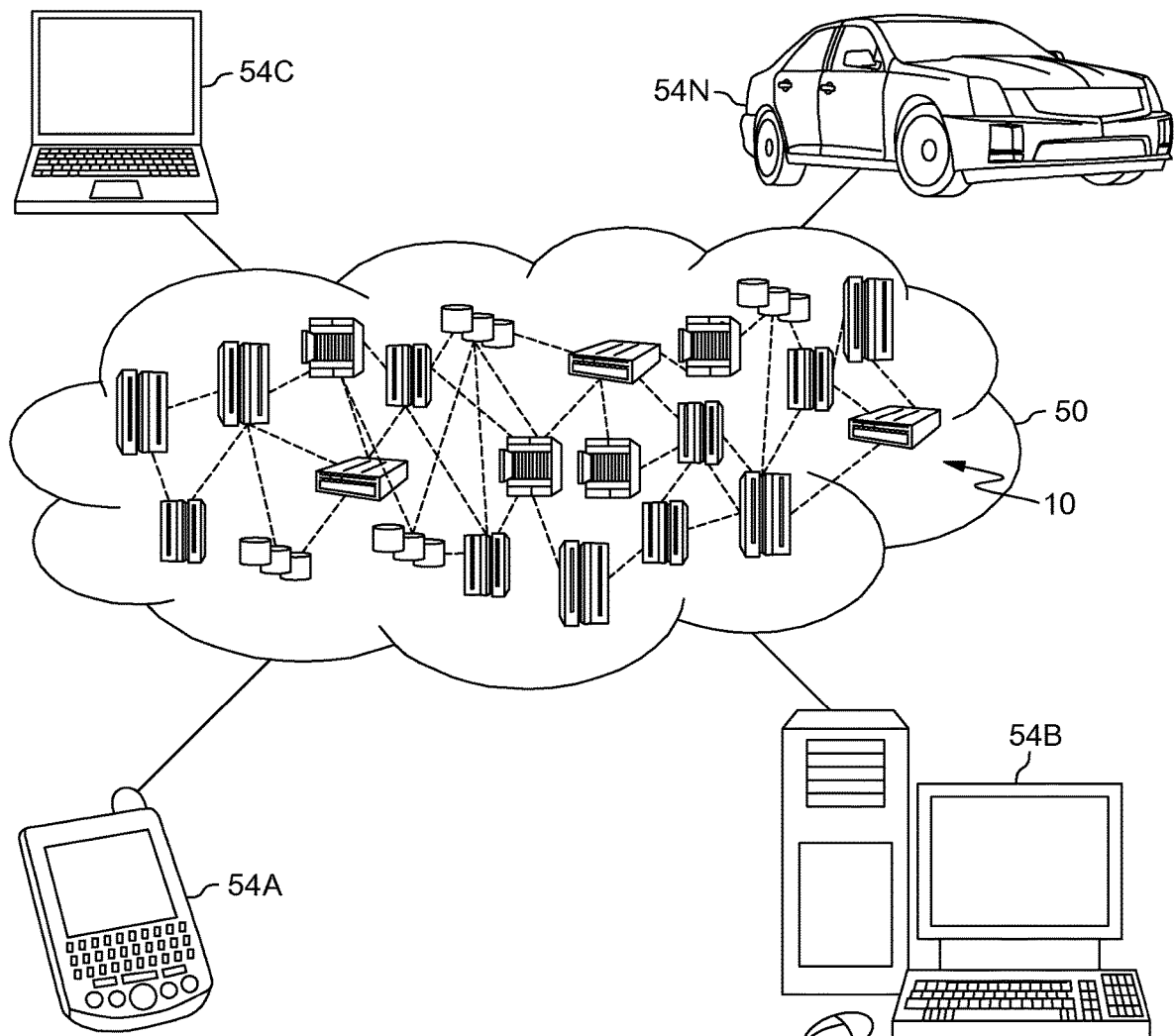
FIG. 1 depicts a cloud computing environment, according to an embodiment of the present invention.

Cloud computing is a growing industry as business entities, and individuals are moving from maintaining and utilizing their own computing infrastructure, to acquiring the right to use various computing needs from a service provider. Due to the constant need of available resources, cloud computing service providers are expected to be operable continually, with minimal down time.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that cloud computing nodes 10 and cloud computing environment 50 can communicate with any type of computerized device over any type of network and/or network addressable connection (e.g., using a web browser).

Figure 2:
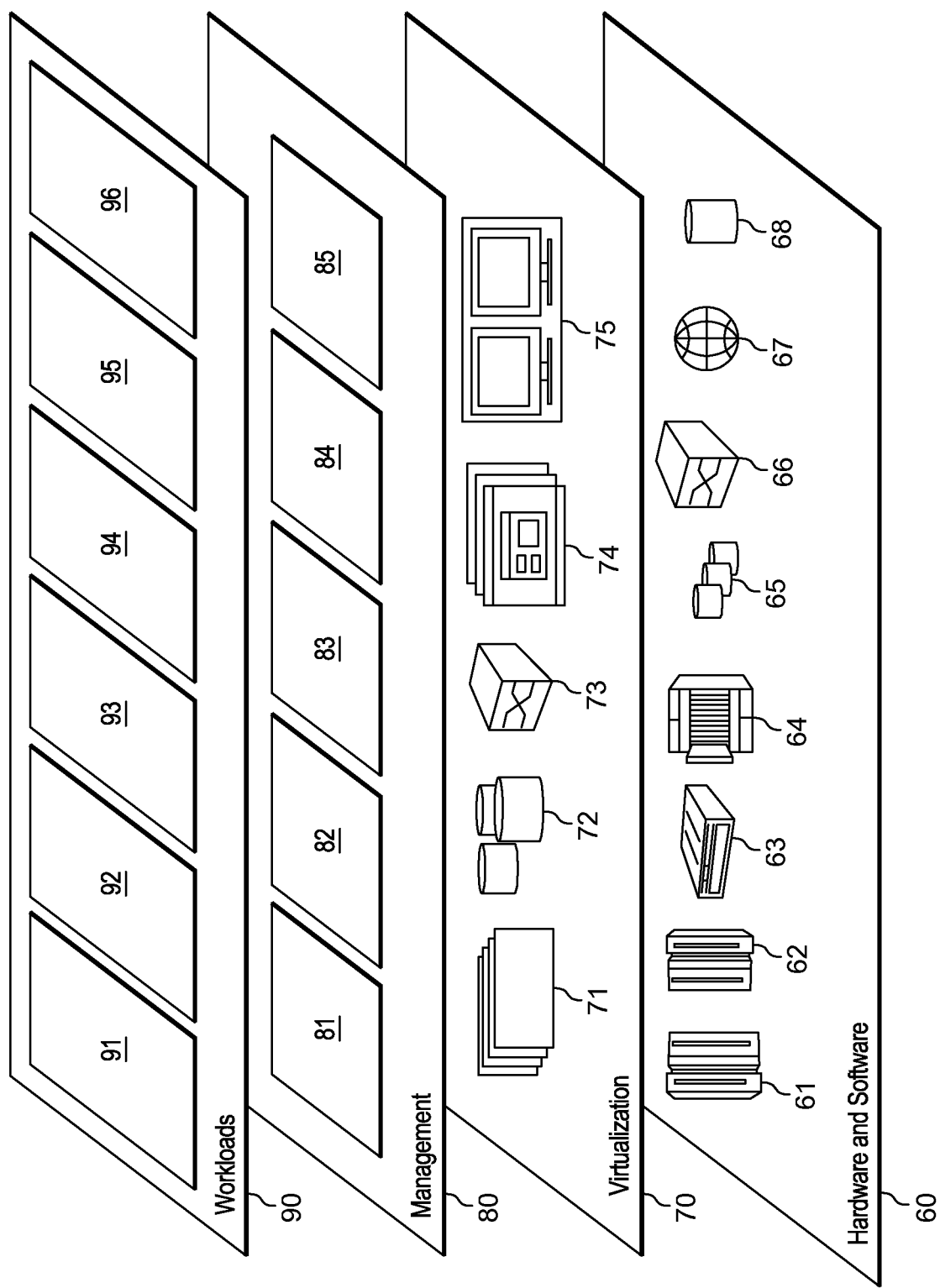
FIG. 2 depicts abstraction model layers, according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and orchestration 96.

Embodiments of the present invention may be utilized in a plurality of environments and functions. Cloud computing services enables organizations to use externally hosted computing resources on which to run their own applications and services. For example, a cloud system may be utilized by: businesses, students, educators, researchers, government agencies, professionals, hospitals and the like.

Generally, the service provider of a cloud, manages and/or controls the underlying infrastructure which may include networks, servers, operating systems and/or storage, and the user (a developer) has control over the deployed applications. Embodiments of the present invention facilitate the construction of high quality scalable applications, by providing generalized software building blocks, as well as, development tools, such as programming languages and support run time environments. Embodiments of the present invention also recognize that cloud services are able to compose and orchestrate multiple applications and services on the same cloud platform.

Embodiments of the present invention utilize an orchestration service. Generally, orchestration describes the automated arrangement, coordination and management of complex computer systems and services. Orchestration may be advantageous in managing and running a system. For example, orchestration services may be responsible for creating and maintaining a cohesive and unified system, allowing it to appear as a single system to a user. In another example, orchestration services may be responsible for coordinating the execution and management of system services and ensuring availability of services. Additionally, orchestration may minimize or eliminate crashes and maintain service availability despite the possibility of failures, both hardware and/or software based.

Embodiments of the present invention recognize that orchestration may tie together computing components into a single manageable collection for the user. For example, orchestration may associate processing, networks, and network security with the running process of computational resources, including virtual machines (VM), operating systems or physical machines.

Embodiments of the present invention also recognize that hardware and/or software may be temperamental. For example, minor issues through large scale failure may threaten various systems, services, service chain, etc. Some embodiments of the present invention may minimize such faults contemplated. For example, orchestration may provide the means to establish various high availability and fault tolerances. Therefore, according to at least one exemplary embodiment of the invention, a manager may be added to the platform increasing the orchestration of services with negligible impacts on performance.

The descriptions of the various scenarios, instances, and examples related to the present invention have been presented for purposes of illustration but are not intended to be exhaustive or limited to the embodiments disclosed.

Figure 3:
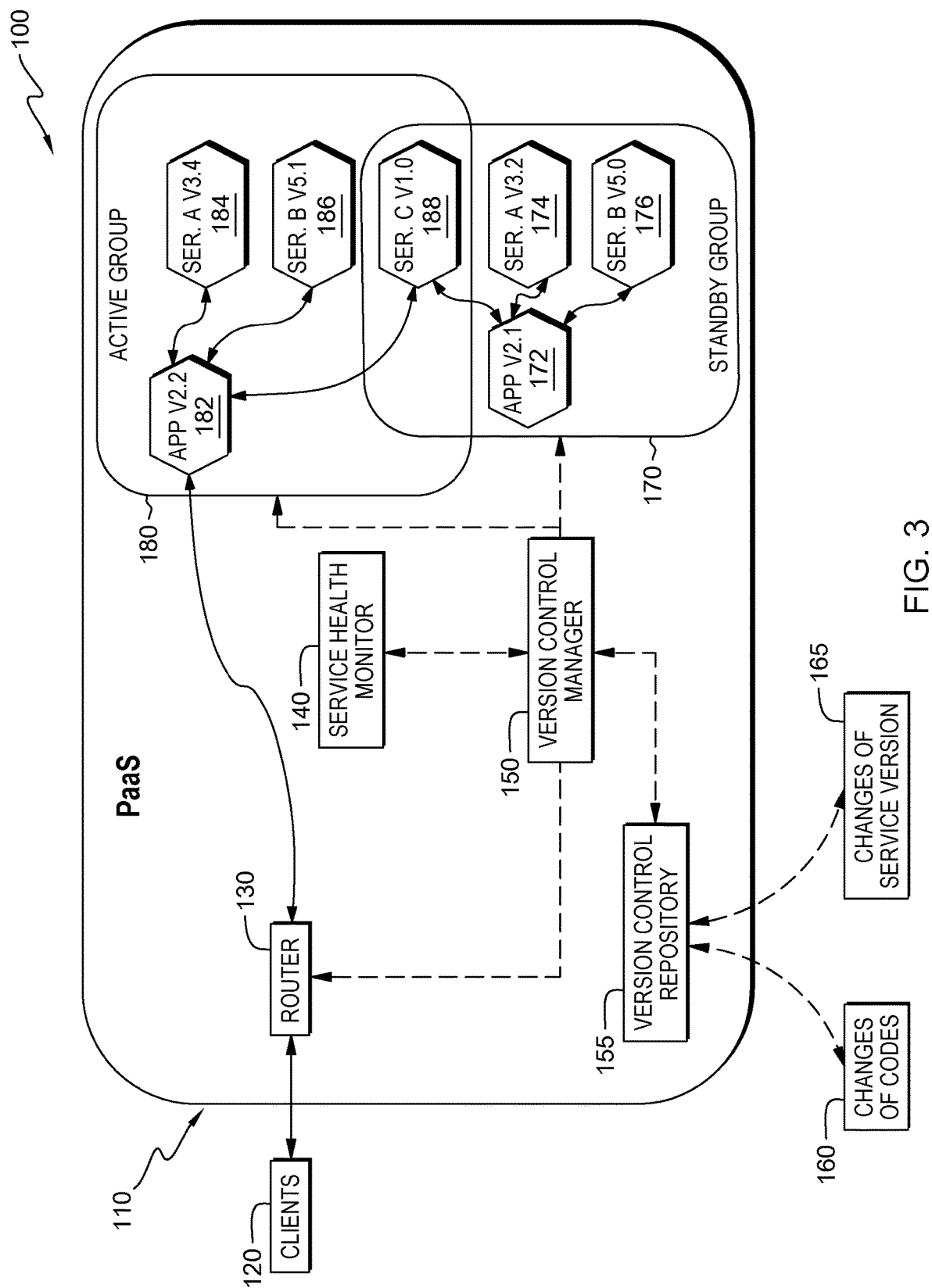
FIG. 3 is a block diagram illustrating a PaaS high availability system, in accordance with an embodiment of the present invention.

The present invention will now be described in detail with reference to the Figures. Reference is now made to FIG. 3. FIG. 3 is an exemplary diagram illustrating a high availability system for orchestrating cloud services, in accordance with an embodiment of the present invention. FIG. 3 provides only an illustration of one embodiment and does not imply any limitations with regard to the environments in which different embodiments may be implemented. Many modifications to the depicted environment may be made by those skilled in the art without departing from the scope of the invention, as recited by the claims.

Embodiment 100 depicts an exemplary diagram for orchestrating cloud services and service chains with a version control mechanism over services in a service chain. In particular, embodiment 100 portrays version control manager 150, orchestrating both an active group 180 and a standby group 170, while processing of a service chain, as a high availability mechanism for orchestrating cloud services and/or service chains.

Cloud applications (commonly referred to as 'App') are generally accessible by a client, for example clients 120 to serve a general purpose. For example, a cloud application may consist of a fitness application which allows a user to keep track of their running status and history. The fitness application example, is not intended to be limiting, rather it is intended to exemplify a characteristic of a cloud application in the context of the present invention.

In contrast to a cloud application, a cloud service (commonly referred to as 'Ser.') provides a more specific capability for a cloud application to achieve a certain goal. Building on the previous fitness app example, a cloud service may utilize a notification service to provide real time running status notification function to its users. Service groups are instances of a service chain with different version combinations and/or groups. As depicted in FIG. 3, both active group 180 and standby group 170 utilize the same version of service instances, Ser. C v1.0, 188 (but with two additional service instances, of different versions, in the two groups, respectively).

Similarly, a service chain, is a set of services utilized by a certain cloud application. A service group is a deployed instance of a service chain. For example different service groups of a service chain run with different version combinations. It is noted that the terms 'Version Group' and 'Version Combination' are used interchangeably herein, and describe the set of version numbers of individual services in a service chain or group.

The occurrence of an error in the active group 180 but not in the standby group 170 may occur due to version change(s) in one or more services in active group 180. It is noted that there is no interaction between the active group 180 and standby group 170 as they are instances of independent deployment of a service chain. The overlap of service instances, Ser. C v1.0 188 merely depicts that the active group 180 and standby groups 170 may share a singular service instance.

In the exemplary embodiment of FIG. 3, two different line styles are depicted. Solid lines represent the message routes, such as lines connecting clients 120 to router 130 and App v2.2 182. Message routes also exist between the various service instances and their respective App. In contrast, dashed lines represent command routes between components for example, as depicted between Service Health Monitor 140, Version Control Manager 150, Version Control Repository 155, etc.

Platform as a Service (PaaS) 110 is depicted for exemplary purposes only. It is noted that environment 100 is not limited to PaaS type services, alternative embodiments may utilize other services known in the art, for example, infrastructure as a service (IaaS), software as a service, (SaaS) and the like. Generally, PaaS 110, is applied to cloud platforms that utilize the concepts of a service chain.

In one embodiment, PaaS 110 may be a toolkit providing convenient developing, deploying and administrating application software for clients 120. For example, PaaS 110 may provide to clients 120 a basic computing infrastructure, middleware and solution stacks. PaaS 110 may also provide various runtime environments, facilitating the construction of high quality and scalable application. PaaS 110 may also support a plethora of subscribers, and process large quantities of data. For example, PaaS 110 allows clients 120 and/or developers to create and run a general application or applications specific to clients 120.

Embodiment 100 depicts clients 120 computing over PaaS 110. Clients 120 represent users of embodiment 100. Generally, clients 120 are application developers who can leverage resources provided by the platforms to create various cloud applications. Those cloud applications may then be accessed by clients 120. Generally, clients 120 will not directly leverage platform resources to create cloud applications. In another embodiment clients 120 may directly leverage platform resources to create cloud applications.

In the exemplary embodiment, clients 120 may communicate directly with PaaS 110 via router 130. Generally a router is a networking device which forwards data packets between computer networks. In a PaaS platform, router 130 is responsible for dispatching requests and/or messages from client 120 to the specific application. Router 130 receives a processing request directly from clients 120 then forwards the request to active group 180 for processing.

The major function of router 130 is to perform the routing to the correct application with the active service group. For example the version control manager 150 will change the route in router 130 to make it point to the active group. In an alternative embodiment, if the cloud is not a PaaS system, the router may not be necessary.

In the exemplary embodiment 100, service health monitor 140 actively monitors the health of the active group 180. For example, service health monitor 140 may report to version control manager 150 of an error, such as those that cause an application transaction to fail, such as a crash of one of the services in the group or unexpected results that prevent the transaction from moving forward.

Service health monitor 140 may actively query the status of monitored services to make sure all services are in a healthy and/or operational state. Service health monitor 140 may additionally receive status logs from monitored services periodically.

Service health monitor 140 may focus on performance and health information of its monitored services, including error information. Error information may include crash reports, and/or unexpected processing results, etc. Performance and health information may include various summary or detailed statistics about the operations of an executing application and/or service chain. For example, service health monitor 140 performance and health information may include a number of requests processed, amount of data transmitted, has an error occurred, etc.

In another example, service health monitor 140 may monitor the health of the active group 180 and the standby group 170 by examining the return code of services in each group. Service health monitor 140 may also record the health of one or both the active group 180 and the standby group 170. In an alternative embodiment, service health monitor 140 monitors, records and reports the health of both active group 180 and standby groups 170 to version control manager 150.

In an embodiment, service health monitor 140 monitors the health and status of ongoing programs running on PaaS 110 and/or a network connection. In another embodiment service health monitor 140 records the health and status of ongoing programs running on PaaS 110 and/or a network connection. In another embodiment, service health monitor 140 may only gather information from monitored services in a service chain. In an alternative embodiment, service health monitor 140 may gather information from other components and aggregate the information, storing such information in a database and/or version control repository 155. In another scenario, service health monitor 140 may alert an administrator when problems may occur, such as problems from various executing applications, service chains, and/or hardware, and the like. An embodiment may include service health monitor 140 providing real time (or near real time) updates and the status of the monitored components. In another exemplary embodiment, service health monitor 140 may contain executable routines for capturing and reporting errors, performance information as well as other information. Additionally, service health monitor 140 may utilize a messaging system to transmit alerts to one or more recipients if an error occurred while processing and/or executing various applications and service chains.

In another exemplary embodiment service health monitor 140 continually monitors cloud hosted applications to ensure resources are being effectively utilized. For example, service health monitor 140 may monitor at least some of the following functionalities: application servers, databases, servers, virtual machine ware, web transactions, etc.

Version control manager 150, manages and maintains the correct service versions in the service chain used by various applications. In an exemplary embodiment, version control manager 150 orchestrates both an active group 180 and a standby group 170 while processing a service chain. Version control manager 150 optimizes the service chain as it improves the efficiency and/or productivity of service organizations.

In one embodiment, version control manager 150 may decide which currently working version combination and previous working version combination are ideal for a given running service chain. Additionally, version control manager 150, upon receipt of an error status report from service health monitor 140 may move the standby group 170 to the active group 180.

In one embodiment version control manager 150 may maintain version information of each orchestrated service in a working chain. The version information of each orchestrated service in a working chain is then saved as a version group for each specific service chain. In an exemplary embodiment, version control manager 150 orchestrates an active and a standby service chain group. For example, if service health monitor 140 detects an error, then version control manager 150 may trigger the standby service chain to act as the active service chain, thereby minimizing any downtime promoting the high availability of the overall system.

In an alternative embodiment, version control manager 150 is able to, determine which active group (i.e., the latest working version combination), and the standby group (i.e., the previous working version combination), are ideal for running service chain instances for a given running service chain. In another exemplary embodiment, version control manager 150 may determine which currently working version combination and previous working version combination are ideal for a given running service chain. In a scenario, if the standby groups service chain instances, are taken off line, then version control manager 150 may return the services in standby to active again, by redirecting traffic to the newly reactivated group.

Version control manager 150 orchestrates the active group 180 and a standby group 170 service chain groups. Version control manager 150 maintains version information of each orchestrated service in a working chain. Additionally, version control manager 150 may also track each version of software running on the system. For example, if service health monitor 140 detects an error, then version control manager 150 may trigger the standby service chain to act as the active service chain, thereby minimizing any downtime promoting the high availability of the overall system. Additionally, in another example, version control manager 150 changes the order of the groups upon a notice that an error occurred from service health monitor 140.

In another exemplary embodiment, version control manager 150 may track any changes made to an application, who made the change, when the change was made. In another exemplary embodiment, version control manager 150 may provide the ability to track changes to service chains, as well as, the ability to recall and reverse the service chain updates to a previous known working version. For example, version control manager 150 may create a log of the precise combination of service versions in the service chain, in conjunction with the last known service version which worked correctly.

In an embodiment, version control manager 150 may additionally track and manage each version of software running on the system. For example, version control manager 150 may manage changes and/or updates to a program or a service version over a period of time. In another exemplary embodiment, version control manager 150 provides a reliable way to record and recover service chains if one crashes while being processed.

Version control manager 150 may assist in debugging a service chain and/or a program, as it allows the application developer to know when particular versions of a program stopped working. For example, version control manager 150 may investigate the cause of a service version failure, including failures due to version updates. Additionally, version control manager 150 may notify application developers upon a service chain failure based on information provided by service health monitor. It is noted however, that it is the developer's responsibility to investigate and root the cause of failure.

Version control repository 155 stores historical changes and the different version history to each individual app and/or service and/or service groups. For example, version control repository 155 may store various code changes and/or service versions. Additionally, version control repository 155 stores and records changes of the code and service version dependency. Version control repository 155 may maintain the correct version combination. For example, version control repository 155 may also maintain changes of code 160 and/or changes of service version 165.

In an exemplary embodiment, version control repository 155 recognizes what a service chain or service group is and keeps track of the change history of its version combination and if a version combination is a successful one. For example, version control repository 155 maintains and manages changes to codes 160, for example an Applications code as well as changes to various service versions. Any changes, modifications, and/or updates of either an application or a service version is recorded and maintained by version control repository 155.

FIG. 3 depicts an application with two different versions (i.e., old version, App V2.1 172, and new version, App V2.2 182). Further, each application is made up of three different services, Ser. A, Ser. B, and Ser. C (App V2.2 182 is comprises three services (1) Ser. A version 3.4 184, (2) Ser. B version 5.1 186, and (3) Ser. C version 1.0 188, whereas App v2.1 172 is made up of (1) Ser. A version 3.2 174, (2) Ser. B version 5.0 176, and (3) Ser. C version 1.0 188). In the depicted example of FIG. 3, version control repository 155 recognizes the service chain/group composed of the three depicted services, Ser. A, Ser. B, and Ser. C used by App. This service group, as depicted, has two versions, App V2.1 172 (currently is the standby group 170), and App V2.2 182 (currently is the active group 180), where App V2.1 172=(Ser. A v3.2 174+Ser. B v5.0 176+Ser. C v1.0 188), and App V2.2 182=(Ser. A v3.4 184+Serv. B v5.1 186+Ser. C v1.0 188). Service group A and service group B both receive an update, whereas service group C remains unchanged. Since service group C is unchanged, it is shared between the applications of App V2.1 172 and App V2.2 182. However, service group A and service group B are updated, between App V2.1 172 and App V2.2 182. Therefore, the active group 180 is made up of the new application, App V2.2 182, and the standby group 170 is made up of the old application, App V2.1 172, and their respective service groups. Version control manager 150 will maintain App V2.2 182 as the active group, until such a time a crash occurs; upon such an occurrence, version control manager 150 will switch the app. V2.1 172 from the standby group 170 to the active group 180, and the App V2.2 182 from the active group to the standby group, and their respective service groups.

Figure 4:
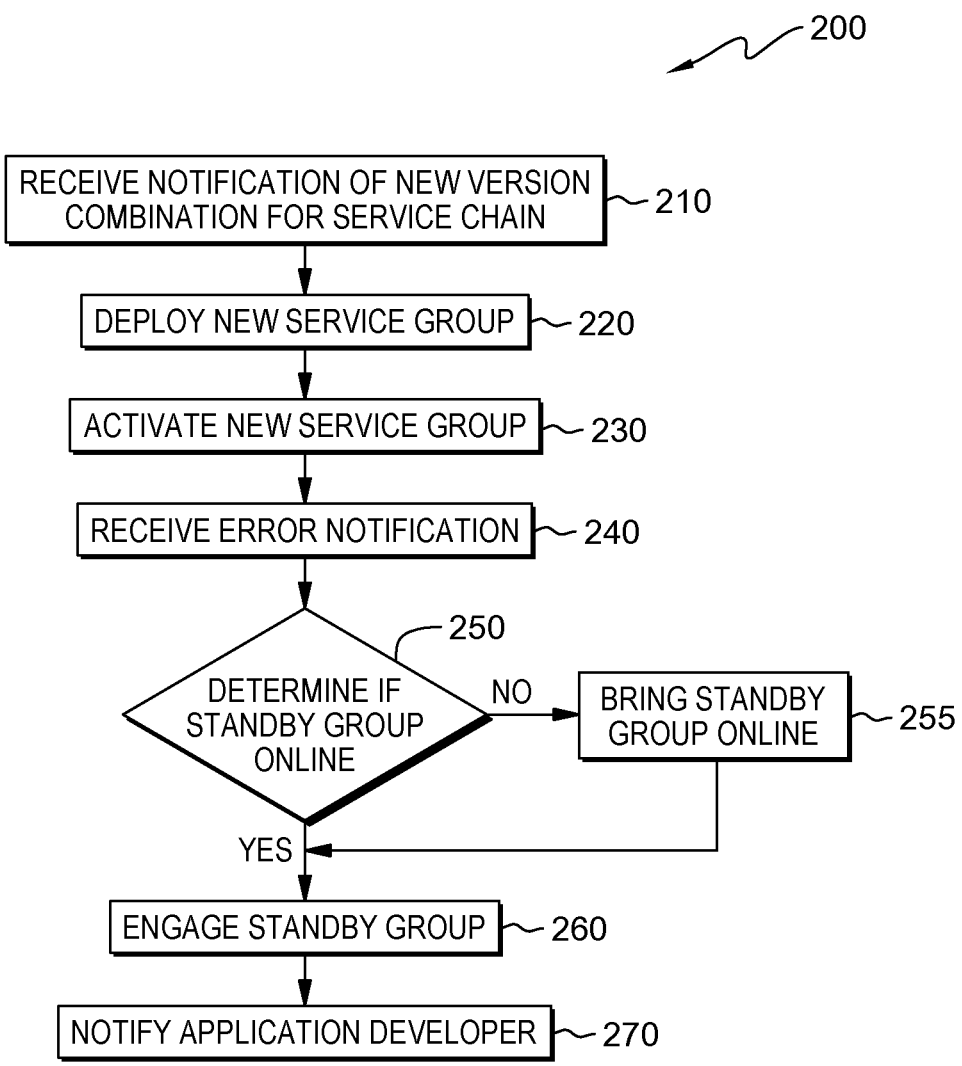
FIG. 4 is a flow chart illustrating operational steps for orchestrating cloud services in accordance with an embodiment of the present invention.

Reference is now made to FIG. 4. FIG. 4 is flowchart 200 illustrating operational steps for orchestrating cloud services, in accordance with an embodiment of the present invention.

Flowchart 200 depicts the version control manager 150 actions when one or more services in the chain get upgraded to new versions. For example, when a new version group is created as the active high availability primary service group then the previous version set becomes the standby high availability secondary service group. If one or more services in the primary group inadvertently crash or are the cause of an error, then traffic may be directed to a secondary group with the previously working version combination. Therefore the previously working combination becomes the primary group again, until another working group is created and deployed. Version control manager 150 restores the orchestrated services to a prior stable version thereby minimizing downtime and increasing efficiency.

In step 210, version control manager 150 receives a notification that a new version combination is available for a target service chain. Version control manager 150 may receive such notification from a version control repository 155. Alternatively, the version control manager 150 may receive such notification from a third device. A new service group may be based on: new codes from the developer, service version dependencies, and the like. In an embodiment, version control manager 150 may utilize service health monitor 140 to monitor for changes in a service group. In another embodiment, version control manager 150 may derive changes in a service group by maintaining version information of each orchestrated service in a working chain. The version information of each orchestrated service in a working chain may be saved as a version group for each specific service chain.

In step 220 version control manager 150 deploys the new service group as the new active group. For example, version control manager 150 may update the new service group in memory. The memory for example, may be that of version control repository 155. For example, upon version control manager 150 issuing changes in a service version, version control manager 150 may then update the new version combination into the version control repository 155. In one embodiment, the service group may be saved along with additional information including but not limited to: who made the changes, the quantity of changes and when the change was made. For example, version control manager 150 copies each service chain into a database. Each time a new service group is run, a copy of the service group is maintained within version control repository 155.

It is noted that the newly activated group refers to the active group after the activation of a new service group. The previous active group may be referred to as the old active group, and/or the new standby group.

Assuming the new service group was deployed successfully, in step 230 version control manager 150 marks the new service group as the active group as well as marks the previous active group as standby. Alternatively, if the new service group was not deployed successfully, then version control manager 150 returns to step 210 and may wait for notification of a new version control combination to become available for target service chain.

In an alternative embodiment step 230 may include additional elements. For example, in addition to activating a new service group, step 230 may also update the information of the new service group to service health monitor 140. Service health monitor 140 may start to monitor the new active group as well as the previous active group. In one scenario, if the active group works fine for a determined period of time, the new version group may be recorded as the latest working version set in the database, and the standby group may be taken offline (for example, shutdown the container instances) to save resources.

In an alternative embodiment, step 230 may include an additional supplementary element. For example, step 230 may also update the routing table in a router 130 in addition to activating a new service group and/or updating the information of the new service group to service health monitor 140. In this scenario, the router may receive a request from a client directly and forwards them to the active service group. For a more detailed example of such steps, refer to FIG. 5, and its corresponding example.

By maintaining both an active and a standby group, version control manager 150 may provide high availability for orchestrated cloud services within a service chain. In one embodiment, when one or more services in the chain get upgraded to new versions, a new version group is created as the active high availability primary service group while the previous version set becomes the standby high availability service group.

In one exemplary embodiment, if the new active group works for a period of time, then the new active group is kept as the working version. Further, the standby group may be taken off line to save resources.

In step 240, version control manager 150 receives an error notification. The error notification may come from service health monitor 140. It is noted that service health monitor 140 monitors both active group 180 as well as standby group 170. In another embodiment, service health monitor 140 monitors only active group 180.

For example, if the services or apps in the active group crash, service health monitor 140 notifies version control manager 150, of the crash. In another example, version control manager 150 receives constant feedback, from service health monitor 140, regarding the state of the processing service chain, allowing it to monitor for any fault or crash within the service chain. In an alternative embodiment, version control manager 150 may examine the return code of services in a group to determine the health of a service chain. Version control manager 150 may also record the health of the code.

In decision 250 version control manager 150 determines if the standby group is online. If the standby group is offline, as in step 255, version control manager 150 brings the standby group back online. The standby group may have been taken off line in step 230 to save resources. Alternatively, if the standby group was never taken off line, it remains online and the process continues with step 260.

In step 260, once standby group is online, version control manager 150 engages the standby group. In one embodiment, the version control manager 150 marks the current standby group as the active group again. For example, version control manager 150 will designate the standby group as the new active group, and reroute traffic to the new active group (previously known as the standby group). Version control manager 150 essentially switches the newer active group with that of the older standby group, in an attempt to avoid down time.

In an alternative embodiment step 260 may include additional elements. For example, in addition to engaging the standby group as the new active group, step 260 may also update the information of the new active group to service health monitor 140. Service health monitor 140 may start to monitor the new active group (previously the original standby group).

In an alternative embodiment, step 260 may include an additional supplementary element. For example, step 260 may also update the routing table in a router 130, to route traffic to the new active group (previously the standby group).

In step 270, the application developer is notified of the service chain crash. The developer, once notified of the crash, may roll back previous working versions. Additionally, the developer may debug any program running to find out why the service chain failed, all while minimizing service down time. For example, the broken version group will be repaired by upgrading certain services in the chain with newer versions, thereby correcting any issues which caused the services to fail. In one scenario, the broken version group will be repaired by upgrading certain services in the chain with new versions, which will go back to step 210 to start the process over.

Accordingly, by performing the operations of FIG. 4, utilizing the active/standby distinction, orchestrated cloud services can quickly and flexibly maintain a stable version and keep service down time to a minimum. Under this implementation the cloud increases its reliability, as it is quickly able to recover from a crashed service chain. For example, reliability is increased as even if the crash was due to a broken update or the incompatibility of the orchestrated services, the cloud services are quickly able to recover from a crashed service chain.

Figure 5:
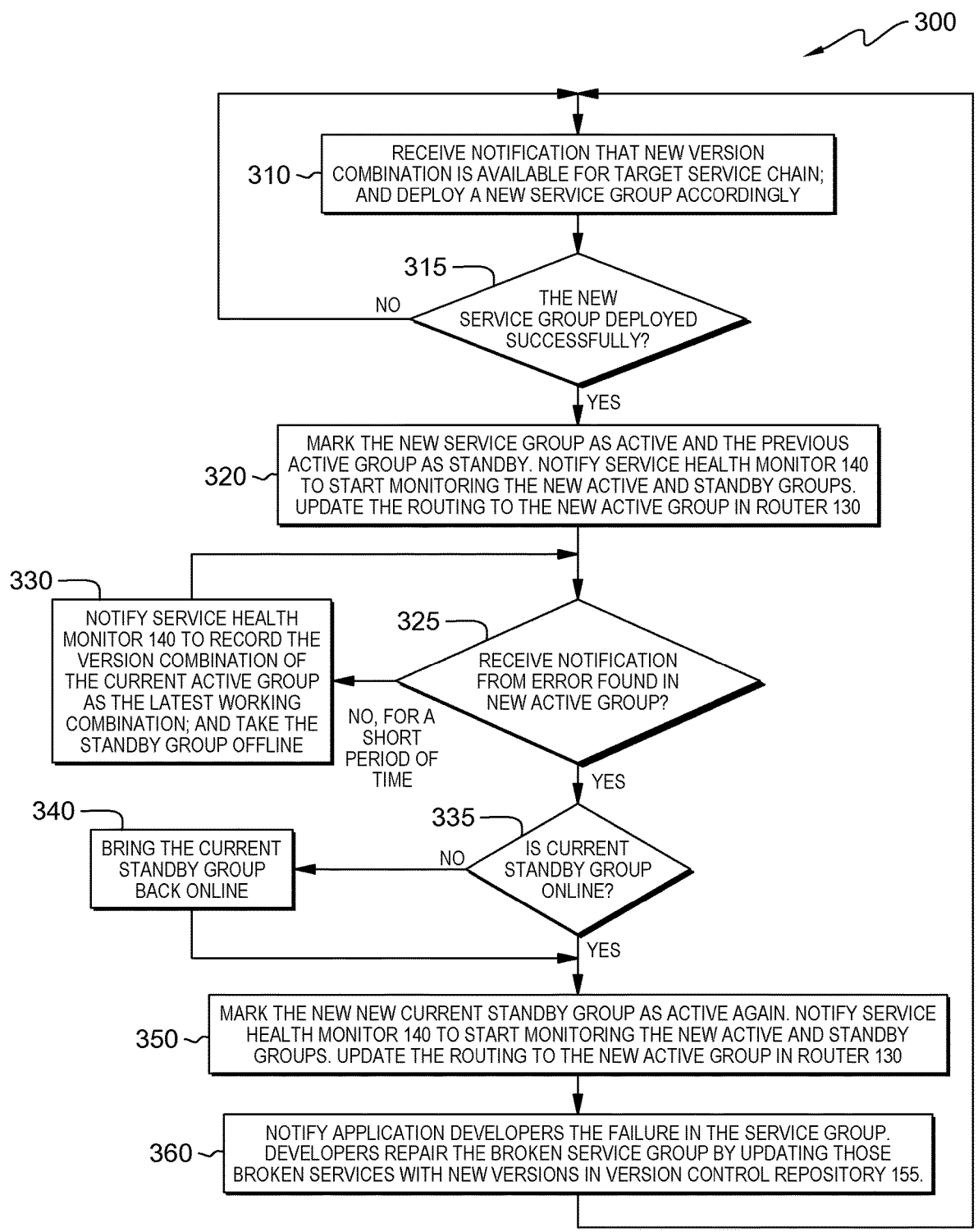
FIG. 5 depicts the operational steps for orchestrating cloud services, in accordance with another embodiment of the present invention.

Reference is now made to FIG. 5. FIG. 5 illustrates flowchart 300 depicting exemplary operational steps of an embodiment for orchestrating cloud services in accordance with another embodiment of the present invention. Specifically, flowchart 300 depicts an example portraying the update to a version combination, and an eventual error in one or more services. Version control manager 150, as depicted in FIG. 5 orchestrates the services to a prior stable version by minimizing downtime and increasing efficiency.

In step 310, version control manager 150 receives a notification from version control repository 155 informing it that a new version combination is available for target service chain. Upon receipt of the notification, version control manager 150 deploys the new service group. The new service group may be based on new codes and service version dependencies. Decision 315 determines whether the new service group was deployed successfully. If the new service group was not deployed successfully, for example, it crashes, then version control manager 150 reinstates the prior version group, notifies the application developer and waits until it receives a notice from either version control repository 155 that a new version combination is available for a target chain, or from service health monitor 140 that the current active group has crashed.

If however, the new service group was deployed successfully, then the process proceeds to step 320. At step 320, version control manager 150 marks the new (the recently deployed version combination) service group as the active group 180, and marks the previous active group as the standby group 170. Additionally, version control manager 150 notifies service health monitor 140 to start monitoring the active group 180 and standby group 170. Service health monitor 140 starts monitoring the active group to detect if an error occurs. Furthermore, version control manager 150 updates the routing to the active group in router 130. Decision 325, of the exemplary operational steps of flowchart 300 is based on a predetermined time threshold. If, for example, upon the expiration of the predetermined time threshold, service health monitor 140 does not notify version control manager 150 that an error is found in the new active group 180, then version control manager 150 may notify service health monitor 140 to record the version combination of the current active group as the latest working combination. Additionally, version control manager 150 may also notify service health monitor 140 to take standby group 170 offline.

In an alternative example, if version control manager 150 receives a notification that an error is found in the new active group 180, from service health monitor 140 (either, prior to or subsequent to the expiration the of the predetermined time threshold), then in decision 335, version control manager 150 must determine if standby group 170 is online. In general, decision 325 concludes upon an occurrence of version control manager 150 receiving a notification from service health monitor 140 that an error in the new active group occurred. Service health monitor 140 actively monitors the health of active group 180, for any error and/or crash to occur. Upon a detection that an error occurred, service health monitor 140 notifies version control manager 150 that an error is found in (the new) active group 180.

Therefore, in decision 335, version control manager 150 must determine if standby group 170 is online. If the error (as detected in decision 325) occurred subsequent to the expiration the predetermined time threshold, then version control manager 150 took standby group 170 off line (per step 330). Therefore, step 340 brings standby group 170 back online, prior to step 350.

However, if an error occurred prior to the expiration of the determined time threshold, standby group 170 is still online (as it was never taken offline in step 330). Therefore, the process may proceed to step 350.

Once standby group 170 is online, in step 350 version control manager 150 marks the current standby group 170 as the active group 180', again, as well as marks the active group 180 as the standby group 170'. Additionally, version control manager 150 notifies service health monitor 140 to start monitoring both active group 180 (previously standby group 170) as well as standby group 170 (previously active group 180). Version control manager 150 may also update router 130 to route the traffic to active group 180'.

At step 360, version control manager 150 may notify the application developers of the failure in the service group. This informs the developers to repair and/or fix the broken service group. Therefore, once developers release new updates for the respective application by updating the broken services with new versions in version control repository 155, the process repeats at step 310, as version control manager 150 receives a notification from version control repository 155 that a new/updated version combination is available for target service chain.

Figure 6:
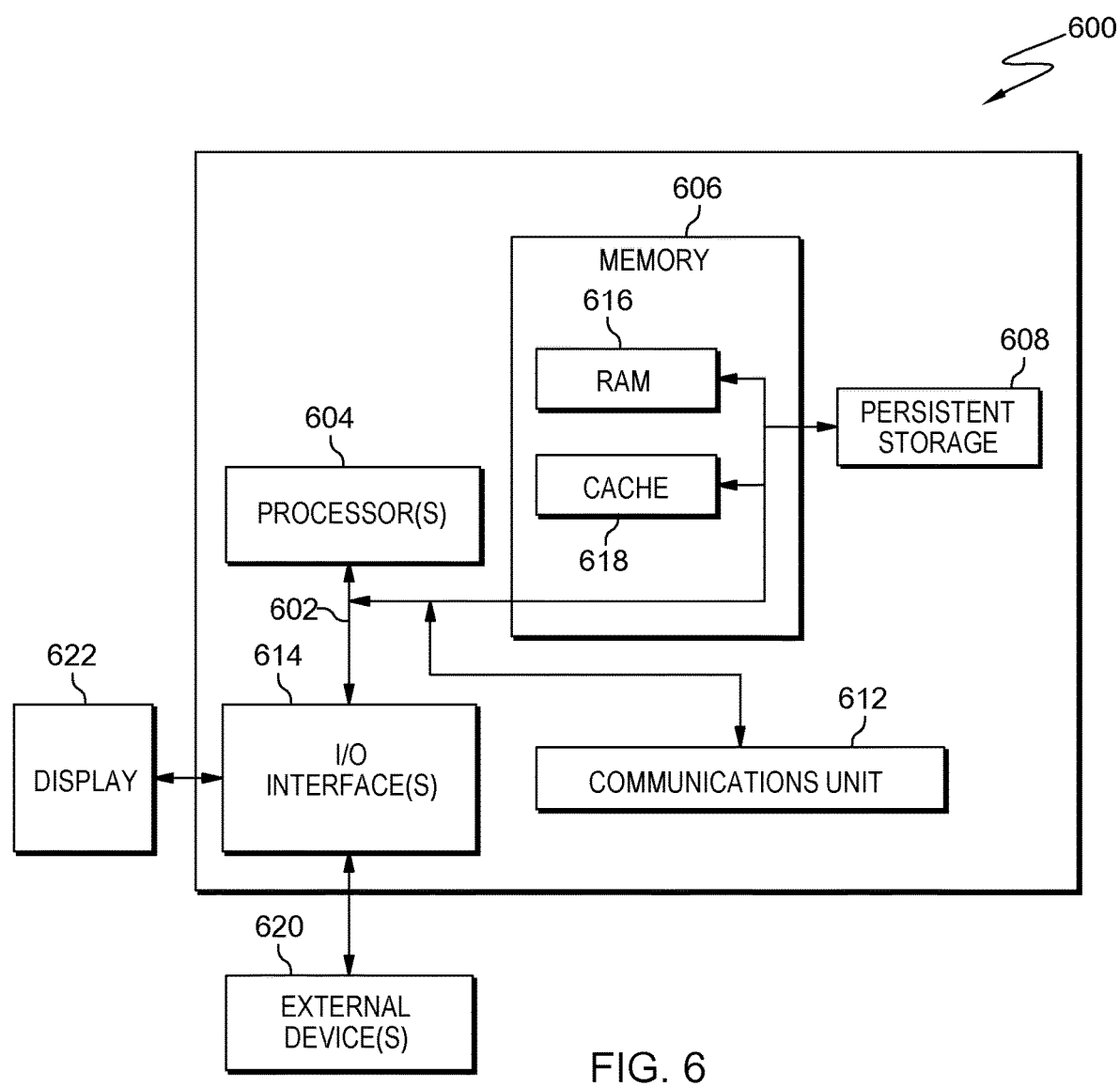
FIG. 6 depicts a block diagram of internal and external components of an electronic device, in accordance with an embodiment of the present invention.

FIG. 6 is a block diagram of internal and external components of a computer system, which is representative of various aspects included in, embodiment 100 of FIG. 3, in accordance with an embodiment of the present invention. It should be appreciated that FIG. 6 provides only an illustration of one implementation and does not imply any limitations with regard to the environments in which different embodiments may be implemented. In general, the components illustrated in FIG. 6 are representative of any electronic device capable of executing machine-readable program instructions. Examples of computer systems, environments, and/or configurations that may be represented by the components illustrated in FIG. 6 include, but are not limited to, personal computer systems, server computer systems, thin clients, thick clients, laptop computer systems, wearable computing devices, tablet computer systems, cellular telephones (e.g., smart phones), multiprocessor systems, microprocessor-based systems, network PCs, minicomputer systems, mainframe computer systems, and distributed cloud computing environments that include any of the above systems or devices.

Computer system 600 includes communications fabric 602, which provides for communications between one or more processors 604, memory 606, persistent storage 608, communications unit 612, and one or more input/output (I/O) interfaces 614. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer readable storage media. In this embodiment, memory 606 includes random access memory (RAM) 616 and cache memory 618. In general, memory 606 can include any suitable volatile or non-volatile computer readable storage media. Software is stored in persistent storage 608 for execution and/or access by one or more of the respective processors 604 via one or more memories of memory 606.

Persistent storage 608 may include, for example, a plurality of magnetic hard disk drives. Alternatively, or in addition to magnetic hard disk drives, persistent storage 608 can include one or more solid state hard drives, semiconductor storage devices, read-only memories (ROM), erasable programmable read-only memories (EPROM), flash memories, or any other computer-readable storage media that is capable of storing program instructions or digital information.

The media used by persistent storage 608 can also be removable. For example, a removable hard drive can be used for persistent storage 608. Other examples include optical and magnetic disks, thumb drives, and smart cards that are inserted into a drive for transfer onto another computer readable storage medium that is also part of persistent storage 608.

Communications unit 612 provides for communications with other computer systems or devices via a network (e.g., network). In this exemplary embodiment, communications unit 612 includes network adapters or interfaces such as a TCP/IP adapter cards, wireless Wi-Fi interface cards, or 3G or 4G wireless interface cards or other wired or wireless communication links. The network can comprise, for example, copper wires, optical fibers, wireless transmission, routers, firewalls, switches, gateway computers and/or edge servers. Software and data used to practice embodiments of the present invention can be downloaded to through communications unit 612 (e.g., via the Internet, a local area network or other wide area network). From communications unit 612, the software and data can be loaded onto persistent storage 608.

One or more I/O interfaces 614 allow for input and output of data with other devices that may be connected to computer system 600. For example, I/O interface 614 can provide a connection to one or more external devices 620 such as a keyboard, computer mouse, touch screen, virtual keyboard, touch pad, pointing device, or other human interface devices. External devices 620 can also include portable computer readable storage media such as, for example, thumb drives, portable optical or magnetic disks, and memory cards. I/O interface 614 also connects to display 622.

Display 622 provides a mechanism to display data to a user and can be, for example, a computer monitor. Display 622 can also be an incorporated display and may function as a touch screen, such as a built-in display of a tablet computer.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computing system comprising:
one or more computer processors;
one or more computer readable storage media; and
program instructions stored on the one or more computer readable storage media for execution by at least one of the one or more processors, the program instructions comprising:
a first group and a second group, wherein the first group is configured to process a plurality of active services, and wherein the second group is configured to process a plurality of standby services;
a switching mechanism on the first group and the second group, wherein the plurality of active services can be activated and deactivated, and wherein the plurality of standby services can be activated and deactivated;
a router, wherein the router is configured to receive a request from a user and forward the request to the first group;
a service health monitor, wherein the service health monitor is configured to monitor and record a health status of the first group and of the second group;
a repository, wherein the repository is configured to store changes of a plurality of services and record changes of the plurality of services;
a version control manager, wherein the version control manager is configured to recall the second group and move it to the first group, based in part on an indication from the service health monitor and a change order recorded in the repository;
program instructions to record a first version combination wherein the first version combination is the set of active services in the first group;
program instructions to monitor the plurality of active services of the first group, wherein monitoring the plurality of active services comprises program instructions to request a query status, at predetermined time intervals, of each service of the plurality of active services;
program instructions to receive an error notification, wherein the error notification identifies a crash in at least one service of the plurality of active services of the first group and wherein the error notification comprises information regarding the error;
responsive to receiving the error notification, program instructions to detect whether the second group is offline;
responsive to detecting that the second group is offline, program instructions to bring the second group to online;
responsive to receiving the error notification, program instructions to deactivating the at least one service of the plurality of active services of the first group that is associated with the error notification, and program instructions to activate at least one service of the plurality of standby services from the second group that corresponds to the deactivated at least one service of the first group;

responsive to receiving the error notification, program instructions to detect, at least one broken service, responsible for the crash from the plurality of services of the first group, and generate a crash report and forwarding it to a service provider of the broken service; and responsive to deactivating the at least one service and activating the at least one service, program instructions to record a second version combination wherein the second version combination is the set of active services in the second group.

2. The computing system of claim 1, further comprising:

a version group, wherein the version group comprises a set of services in a service chain; and the version control manager is configured to maintain the set of services in the service chain.

3. The computing system of claim 1, wherein the repository is configured to store a plurality of standby services.

4. The computing system of claim 1, wherein the repository is configured to store a version group, wherein the version group comprises version information of at least one orchestrated service in a working service chain.

5. The computer system of claim 1, wherein the computer system is configured to operate as a platform as a service (PaaS).

6. A computer system comprising:

one or more computer processors;

one or more computer readable storage media; and program instructions stored on the one or more computer readable storage media for execution by at least one of the one or more processors, the program instructions comprising:

program instructions to utilize a first group and a second group, wherein the first group comprises a first application that sends messages to a plurality of active services and the second group comprises a second application that sends messages to a plurality of standby services;

program instructions to implement a switching mechanism on the first group and the second group wherein the plurality of active services can be activated and deactivated, and wherein the plurality of standby services can be activated and deactivated, in response to identifying at least one service from the plurality of active services of the first group that is newer than a corresponding standby service of the plurality of standby services of the second group, wherein the switching mechanism sends the messages among the first group and the second group;

program instructions to establish a plurality of routes, the first group with the second group wherein the plurality of routes resides within the first group and the second group to support the switching mechanism sending the messages among the first group and the second group;

responsive to program instructions to establish the plurality of routes with the first group and the second group, program instructions to send the messages, where:

(i) the first application and the second application have respective routes, among the plurality of routes, to at least one active service within the first group and at least one standby service within the second group, (ii) each active service, among the plurality of active services, have respective routes, among the plurality of routes, to the first application, and (iii) each standby service, among the plurality of standby services, have respective routes, among the plurality of routes, to the second application.

* * * * *